United States Patent [19]
Hoese et al.

[11] Patent Number: 5,819,115
[45] Date of Patent: Oct. 6, 1998

[54] DRIVER BUNDLE INCLUDING A COMPRESSED, SELF-EXTRACTING, EXECUTABLE DRIVER FOR THE HOST PROCESSOR AND AN ADAPTER DRIVER FOR THE PROCESSOR OF A NETWORK ADAPTER CARD

[75] Inventors: Geoffrey B. Hoese, Travis County; Scott C. Johnson, Williamson County; Rodney S. Canion, Travis County, all of Tex.

[73] Assignee: Compaq Computer Corporation, Houston, Tex.

[21] Appl. No.: 672,648

[22] Filed: Jun. 28, 1996

[51] Int. Cl.⁶ .................................................. G06F 13/00
[52] U.S. Cl. .................... 395/888; 395/851; 395/829; 395/831; 395/822; 395/68.1; 395/183.14; 395/114; 395/651; 364/715.12; 455/418; 707/530; 711/206; 358/406
[58] Field of Search .......................... 455/418; 707/530; 701/1; 711/206; 358/406; 364/715.12; 395/68.1, 183.14, 114, 652, 651, 138.14

[56] References Cited

U.S. PATENT DOCUMENTS

| | | | |
|---|---|---|---|
| 5,249,218 | 9/1993 | Sainton | 455/418 |
| 5,325,297 | 6/1994 | Bird et al. | 707/530 |
| 5,414,850 | 5/1995 | Whiting | 395/681 |
| 5,511,151 | 4/1996 | Russell et al. | 395/114 |
| 5,530,847 | 6/1996 | Schieve et al. | 395/183.14 |
| 5,574,907 | 11/1996 | Jernigan, IV et al. | 701/1 |
| 5,598,563 | 1/1997 | Spies | 395/652 |
| 5,613,123 | 3/1997 | Tsang et al. | 395/651 |
| 5,640,248 | 6/1997 | Hirokawa | 358/406 |
| 5,668,970 | 9/1997 | Cowart et al. | 711/206 |
| 5,671,413 | 9/1997 | Shipman et al. | 395/652 |
| 5,673,392 | 9/1997 | Nakashima et al. | 364/715.02 |

FOREIGN PATENT DOCUMENTS

WO 94/19768  9/1994  WIPO.

*Primary Examiner*—Thomas G. Black
*Assistant Examiner*—Thuy Pardo
*Attorney, Agent, or Firm*—Akin, Gump, Strauss, Hauer & Feld, L.L.P.

[57] ABSTRACT

A driver bundle including a compressed, executable and self-extracting host driver prepended to an adapter card driver to form a single executable driver bundle. The driver bundle has a size less than the maximum allowable size for a command file, which is 64 Kbytes as defined by MS-DOS®. The combined size of the expanded host driver and the adapter card driver is greater than the maximum allowable size. When the driver bundle is executed, it commands a processor of a computer system to expand and execute the host driver. The computer system includes a network adapter card with an adapter processor for executing the adapter card driver. When executed, the host driver commands the processor to retrieve and download the adapter card driver to the network adapter card for execution by the adapter processor.

19 Claims, 3 Drawing Sheets

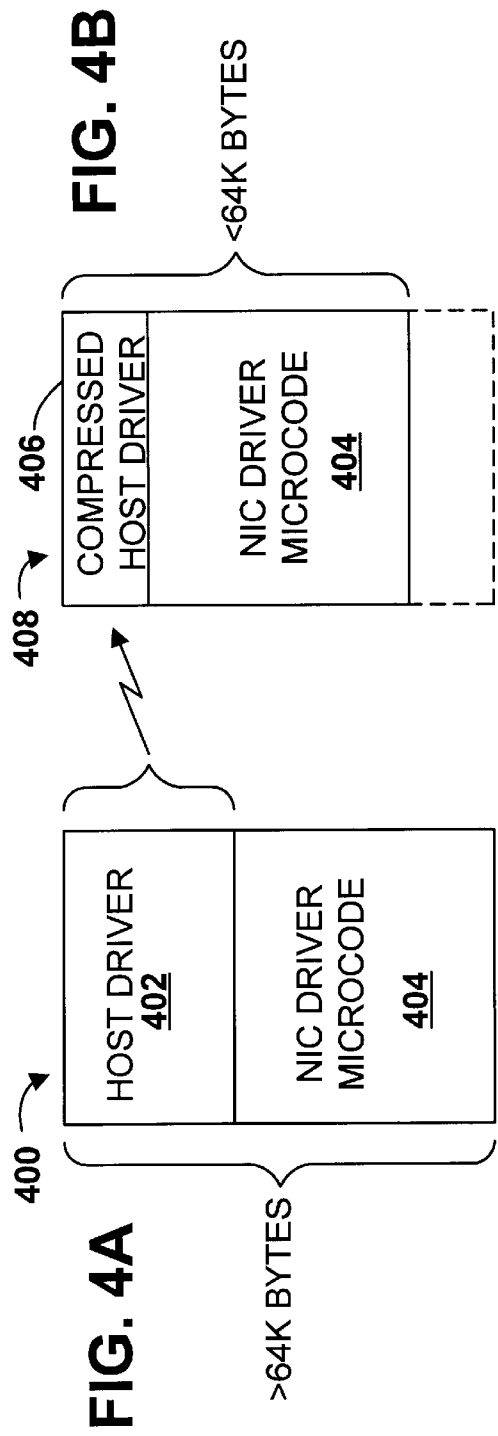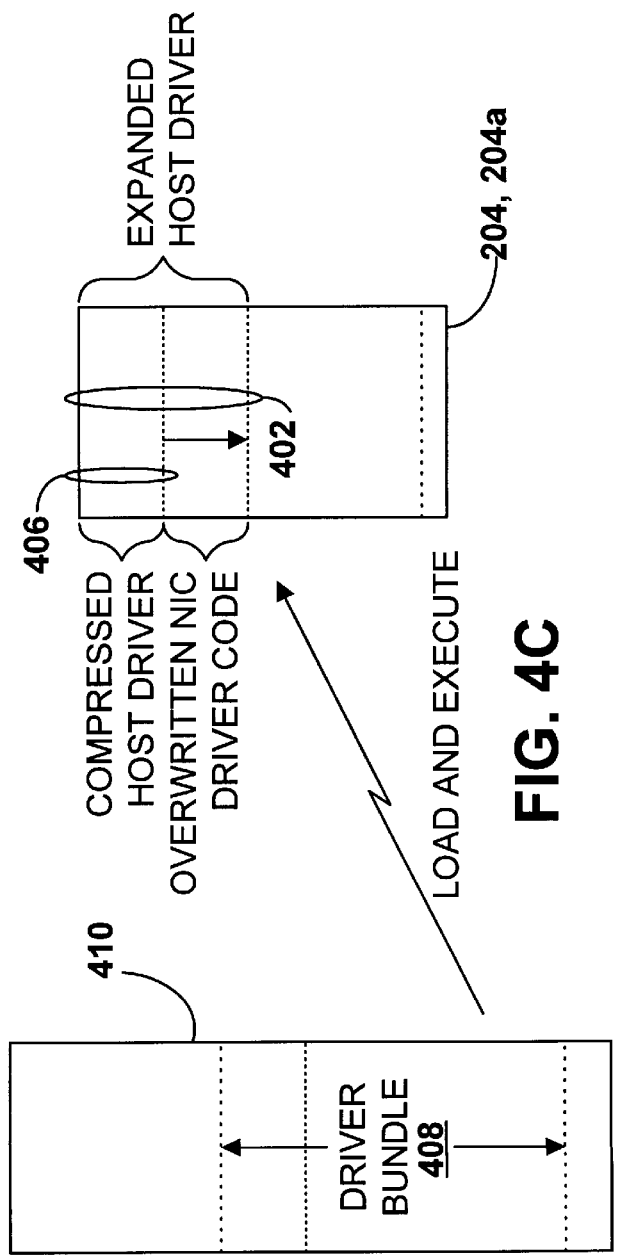

DRIVER BUNDLE INCLUDING A COMPRESSED, SELF-EXTRACTING, EXECUTABLE DRIVER FOR THE HOST PROCESSOR AND AN ADAPTER DRIVER FOR THE PROCESSOR OF A NETWORK ADAPTER CARD

FIELD OF THE INVENTION

The present invention relates to the field of networking devices, and more particularly to a driver bundle containing driver routines for the host processor of a computer system and the processor of a network adapter card coupled to the computer system.

DESCRIPTION OF THE RELATED ART

There are many different types of networks and network systems for sharing files and resources or for otherwise enabling communication between two or more computers. Networks may be categorized based on various features and functions, such as message capacity, range over which the nodes are distributed, node or computer types, node relationships, topology or logical and/or physical layout, architecture based on cable type and data packet format, access possibilities, etc.

For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc. The architecture of a network generally refers to the cabling or media and media access used as well as the packet structure of the data transmitted across the media. Various architectures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network architecture using coaxial, twisted pair or fiber-optic cables for operation at 2.5 Mbps. IBM Token Ring topologies use special IBM cable or fiber-optic cable for operation at 4 or 16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs), otherwise referred to as network adapters, as well as various other devices on the network, such as repeaters, bridges, switches, routers and brouters, to name a few examples.

A computer system or node typically includes an expansion or input/output (I/O) bus with one or more slots for receiving expansion cards that expand or otherwise add functionality to the computer system. One example is a network adapter card or NIC for enabling the computer to attach to and communicate with a compatible network. The NIC is implemented to support the particular physical media and network protocol desired. For example, a NIC could include an RJ-45 plug for coupling to a twisted-pair cable or a BNC T-connector for coupling to a coaxial cable. The NIC is configured appropriately for interfacing the computer to an Ethernet network, such as 10Base-T or 100Base-TX, or to a token ring network, or to any other type of protocol supported by a network.

A computer system equipped with an appropriate NIC for interfacing with a network requires compatible drivers for proper operation. A host driver is executed by the host or main processor of the computer system for enabling proper communication and functionality between the NIC and its host computer. A NIC also generally includes a processor and corresponding NIC driver code for controlling operation of the NIC itself. Thus, two separate driver routines are required. Further, it is often desired to modify and/or upgrade one or both drivers to eliminate problems, bugs or to comply with protocol changes or upgrades.

Original 8-bit PC architectures based on MS-DOS®, the disk operating system by Microsoft®, segmented memory into 64 kilobyte (1 Kbyte=1024 bytes) blocks. MS-DOS® restricted command files to a size of 64 Kbytes or less, which restriction is still imposed. It is desired that device driver routines maintain the 64 Kbyte size restriction to minimize memory footprint. However, as further modifications and enhancements have been made to driver routines, the size of the routines have continuously increased. The size of the both driver routines together has exceeded the required size of 64 Kbytes.

It is desired to provide a combined driver package as a single command file. A primary reason for a single-file driver is ease of use. A user may not be aware of the two separate driver files and may inadvertently load one without the other, thereby resulting in compatibility problems. The user would be forced to make a technical support phone call, which results in lost time and increased expense.

Another reason for a single-file driver is to avoid problems associated with diskless workstations. A diskless workstation is a computer system that does not have disk storage hardware, such as floppy disk drives, hard disk drives, CD-ROMs, etc., but may have dynamic memory, such as dynamic random access memory (DRAM) or the like, for emulating a disk. Upon power-up, a diskless workstation typically retrieves boot up code from a server connected to a network. The network adapter card includes minimal yet robust boot-up code, which enables the workstation to access files on a server in the network. The server includes storage media for storing the latest driver routines for that workstation. If the driver routines are stored as separate files, then at least two separate accesses to the server are required for each diskless workstation. Further, separate files force the workstation to reset or power cycle the network adapter card to load the new driver.

SUMMARY OF THE INVENTION

A driver bundle according to the present invention includes a compressed, executable and self-extracting host driver prepended to an adapter card driver to form a single executable driver bundle. The executable driver bundle has a size less than the maximum allowable size for a command file, which is 64 Kbytes as defined by MS-DOS®. The combined size of the expanded host driver and the adapter card driver is greater than the maximum allowable size, and thus would otherwise be separated into two separate files. When the driver bundle is executed, it commands a host processor of a computer system to expand and execute the host driver. The computer system includes a network adapter card with an adapter processor for executing the adapter card driver. When executed, the host driver commands the processor to retrieve and download the adapter card driver to the adapter card for execution by the adapter processor.

A computer system according to the present invention includes a host processor for executing a driver bundle, where the driver bundle includes a compressed, self-extracting host driver prepended to an adapter card driver. The computer system includes host memory, an expansion bus and an adapter card coupled to the expansion bus. The adapter card is for any desired function, such as a network adapter card for enabling communication with a network. The adapter card includes an adapter processor and adapter memory for executing the adapter card driver. When the driver bundle is executed by the host processor, it commands the host processor to expand the compressed host driver within the host memory and then to execute the expanded host driver, which causes the host processor to download the adapter card driver to the adapter memory of the adapter card.

The computer system preferably includes a storage device for storing the driver bundle. For example, the storage device is a floppy disk drive, a hard disk drive, a CD-ROM drive, or any other type of storage device. The driver bundle is loaded into the memory of the computer system and executed by the host processor. Alternatively, the computer system is a diskless workstation coupled to a network, where the network includes a storage device, such as a disk drive of a server system of the network. Upon power up of the computer system, the adapter card retrieves the driver bundle from the network storage device and loads the driver bundle into the main memory for execution by the processor.

A method according to the present invention for providing drivers for a computer system and an adapter card, comprises the steps of compressing a host driver into a self-extracting, executable command file and appending an adapter card driver to the end of the compressed host driver forming a single driver bundle command file. A method according to the present invention may further include the steps of loading the driver bundle command file into memory of a computer system, executing the driver bundle command file, extracting the host driver within the memory, retrieving the adapter card driver from the storage device, and downloading the adapter card driver to an adapter card plugged into the computer system.

BRIEF DESCRIPTION OF THE DRAWINGS

A better understanding of the present invention can be obtained when the following detailed description of the preferred embodiment is considered in conjunction with the following drawings, in which:

FIG. 4A is a figurative diagram showing a driver package for controlling operations of the network interface card of FIG. 3 installed in the computer system of FIG. 1;

FIG. 4B is a figurative diagram illustrating a driver bundle according to the present invention;

FIG. 4C is a figurative diagram illustrating storage and execution of the driver bundle of FIG. 4B.

DETAILED DESCRIPTION OF THE PREFERRED EMBODIMENT

Figure 1:
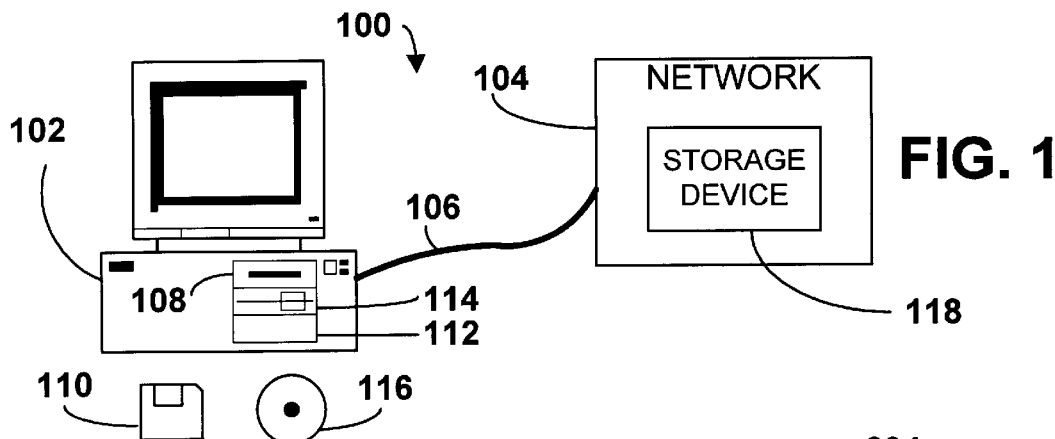
FIG. 1 is a perspective view of a network system including a network and a computer system coupled through a network segment or cable.

Referring now to FIG. 1, a perspective view is shown of a network system 100, which includes a computer system 102 coupled to a network 104 across a cable segment 106. The network 104 includes one or more network devices or nodes coupled together across one or more cable segments, so that the computer system 102 communicates with the one or more network devices in the network 104 through the cable segment 106. In the embodiment shown, the network 104 includes a storage device 118 for storage of data. The storage device 118 is either stand-alone or may be coupled to and controlled by a computer system, such as a server of the network 104. The storage device 118 is one of several different types of storage devices, such as magnetic disks, optical disks, etc.

The computer system 102 may be any one of many different types of computer systems known to those skilled in the art, such as a personal computer (PC), a microstation, a workstation, etc. The computer system 102 may also be a diskless workstation, which boots directly from the network 104, as described further below. The cable segment 106 is any type of network physical media, such as coaxial cables, twisted-pair cables, fiber-optic cables for the FDDI (Fiber Distributed Data Interface), etc. The network 104 and the cable segment 106 operate according to any network protocol, such as Ethernet, IBM Token Ring, ARCnet (Attached Resource Computer Network), etc.

The computer system 102 typically includes one or more magnetic disk drives for storage and retrieval of data and files. In the embodiment shown, the computer system 102 includes a floppy disk drive 108 for receiving a floppy disk 110, where the floppy disk drive 108 reads data from and writes data to the floppy 110. The computer system 102 also includes a hard disk drive 112 including an internal magnetic disk for storage and retrieval of data and files. The computer system 102 may also include other types of drives or devices for storage and retrieval of data, such as a CD-ROM drive 114 for reading data from an optical CD-ROM disk 116. In this manner, the computer system 102 retrieves programs, files, data etc. from one of many sources, including the floppy 110, the CD-ROM 116, the hard disk drive, etc. Such programs include applications and drivers for operating various hardware components of the computer system 102.

In an alternative embodiment, the computer system 102 is a diskless workstation which does not include the floppy disk drive 108, the hard disk drive 112, the CD-ROM 114, etc. Instead, the computer system 102 includes a network interface card (NIC) 210 (FIG. 2) with a boot ROM 314 (FIG. 3), which powers up and retrieves further boot-up information from the network 104. In the embodiment shown, such boot-up information is retrieved from the storage device 118 from the network 104. For example, the network 104 may include a server system or the like for controlling the storage device 104, which stores the desired boot-up microcode for booting up the computer system 102.

Figure 2:
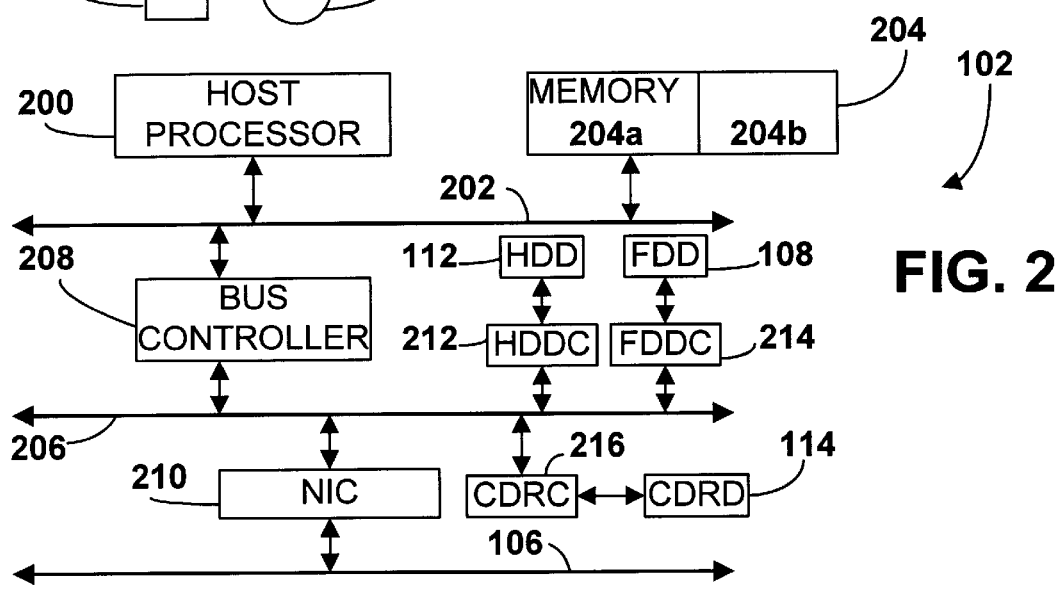
FIG. 2 is a block diagram of the computer system of FIG. 1.

Referring now to FIG. 2, a block diagram is shown of the computer system 102 coupled to the segment 106. The computer system 102 is simplified since complete details are not necessary for a full understanding of the present invention. The computer system 102 includes a host processor 200 coupled to a host bus 202, such as the peripheral component interconnect (PCI) bus or the like, which is also coupled to a host or main memory 204. The main memory 204 may be any one of many forms of random access memory (RAM) or the like, and typically includes a memory controller for interfacing the host bus 202. The computer system 102 further includes an input/output (I/O) or expansion bus 206, such as the industry standard architecture (ISA) or AT bus or the Extended ISA (EISA) bus or the like. The expansion bus 206 is coupled to the host bus 202 through an interface bridge or bus controller 208. The expansion bus 206 typically includes one or more I/O slots (not shown) for receiving plug-in expansion cards for expanding or otherwise adding functionality to the computer system 102. In the embodiment shown, a network interface card (NIC) 210 is plugged into a slot of the expansion bus 206 for interfacing the computer system 102 to the segment 106 and thus to the network 104. In particular, the NIC 210 operates to enable the computer system 102 to communicate with the one or more network devices of the network 104.

The expansion bus 206 may be a single bus or may include a separate I/O bus and an expansion or "X-bus" portion for interfacing several internal hardware components of the computer system 102 as known to those skilled in the art. In the embodiment shown, a hard disk drive controller (HDDC) 212, a floppy disk drive controller (FDDC) 214 and a CD-ROM controller (CDRC) 216 are coupled to the expansion bus 206 for coupling to and controlling the hard disk drive (HDD) 112, the floppy disk drive (FDD) 108 and the CD-ROM drive (CDRD) 114, respectively. In this manner, data, files, programs or the like may be loaded into the main memory 204 from the hard disk drive 112, the floppy disk drive 108 or the CD-ROM drive 216 and accessed or otherwise executed by the processor 200. Also, the data, files, programs, etc. may be loaded into the main memory 204 from the network 104 through the NIC 210.

For a diskless workstation where the hard disk drive 112, the floppy disk drive 108 and the CD-ROM drive 114 are not provided, most or all such data, files and programs are provided from the storage device 118 of the network 104 through the NIC 210. The main memory 204 for a diskless workstation is typically divided into at least two portions, including a first an executable portion 204a for storing the routines executed by the processor 200, and a second ramdisk portion 204b for emulating a disk drive. In this manner, files and programs from the storage device 118 are loaded into the ramdisk portion 204b, and then transferred to the executable portion 204a for execution by the processor 200. Of course, a diskless workstation may be implemented in many other ways, such as a separate DRAM memory other than the main memory 204.

Figure 3:
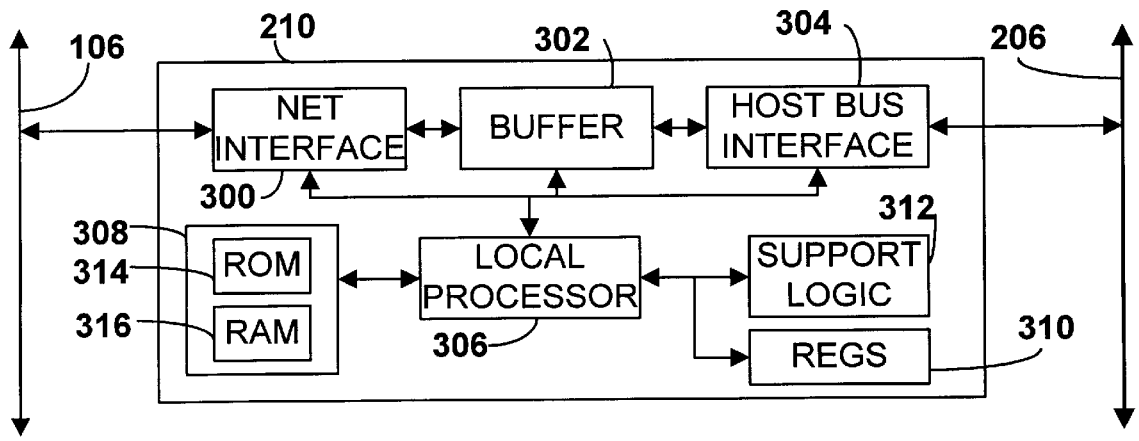
FIG. 3 is a more detailed block diagram of the network interface card for plugging into an I/O slot of the computer system of FIG. 2.

Referring now to FIG. 3, a more detailed block diagram is shown of the NIC 210. The NIC 210 includes net interface logic 300 for coupling to the segment 106 and a local memory buffer 302. The particular implementation of the net interface logic 300 depends upon the physical media of the segment 106 and the protocol used by the network 104. The net interface logic 300 is typically implemented to correspond to the Open Systems Interconnection (OSI) Reference Model and includes logic for implementing the physical interface with the cable segment 106. The physical interface includes circuitry for implementing a lower PMD (Physical Medium Dependent) layer, which is the lower layer of the physical interface, and an upper PHY layer, which defines the electrical interface. Signal-encoding and signal-decoding schemes are defined at the PHY layer, which mediates between a media access control (MAC) layer above it and the PMD layer below it. The MAC layer defines the frame formats and also the media-access method used by the network 104, and corresponds to the lower portion of the OSI Reference Model data-link layer.

The net interface logic 300 operates to detect and receive data from, and to assert data onto, the segment 106, according to the particular protocol supported. In the embodiment shown, the data is in the form of packets or frames according to an Ethernet or the token ring architecture or protocols. However, other types of architectures are contemplated, such as ARCnet, Asynchronous Transfer Mode (ATM), etc. Each data packet has a size ranging from several bytes to several kilobytes (Kbytes). For example, Ethernet packets may range up to 1,518 bytes, and token ring packets range up to 16 Kbytes or more. Each packet is serially communicated one bit at a time on the segment 106 by either the NIC 210 or the network 104 according to the particular protocol in use. Each data packet asserted on the segment 106 from the network 104 is retrieved by the net interface logic 300 and converted to the appropriate form for temporary storage in the buffer 302. The buffer 302 is preferably dynamic RAM (DRAM), although other types of memory are contemplated, such as static RAM (SRAM) or the like.

Eventually, the data from the network 104 stored in the buffer 302 is transferred to the main memory 204 through a bus interface device 304 provided on the NIC 210 for coupling to the expansion bus 206. The bus interface device 304 also receives data from the main memory 204 through the expansion bus 206 of the computer system 102 and stores the data into the buffer 302. In this manner, both the segment interface device 300 and the bus interface device 304 include circuitry for reading from and writing to the buffer 302. Both interface devices 300, 304 are typically implemented in hardware, and are preferably in the form of state machines. The bus interface device 304 may be implemented in any desired manner for transferring data between the NIC 210 and the computer system 102. In one embodiment, the bus interface device 304 operates as a bus master adapter for gaining control of the expansion bus 206 to perform direct memory access (DMA) transfers between the buffer 302 and the memory 204. In an alternative memory-mapped scheme, the host processor 200 controls data transfer, and the bus interface device 304 operates as a slave for transferring data between the buffer 302 and the memory 204.

The flow of data through the NIC 210 is controlled by a local processor 306 coupled to the interface devices 300, 304 and the memory buffer 302. The processor 306 typically includes a local memory 308 for storing start-up and driver routines for execution by the processor 306, as well as for storing data and parameters. The memory 308 includes both a read only memory (ROM) 314 and a RAM 316. The ROM 314 stores an initial boot-up routine during power up and the RAM 316 stores driver microcode for controlling the primary operation of the NIC 210. The processor 306 is also coupled to one or more registers 310 for control purposes as well as support logic 312. The registers 310 enable passing of interrupt signals and status signals between the NIC 210 and the computer system 102.

Referring now to FIG. 4A, a figurative diagram is shown of a driver package 400 for controlling operations of the NIC 210 installed in the computer system 102. The driver package 400 is shown as a single file including a host driver 402 for execution by the host processor 200 prepended to a adapter card driver microcode 404 for execution by the processor 306 located on the NIC 306. In the embodiment shown, the host driver 402 is approximately 30 Kbytes in size and the adapter card driver 404 is approximately 46 Kbytes in size for a total of approximately 76 Kbytes. Such a combined driver package is too large for the requirements of a command file (COM file) for typical PC systems, which must have a maximum size of 64 Kbytes. The particular sizes of these drivers may vary, but the combined size is still greater than 64 Kbytes. Thus, the combined driver package 400 may not be loaded and executed directly by the processor 200 as a command file. It is possible to compress the entire driver package 400 using available compression schemes or algorithms into a smaller design package. However, such compression would still require that the host driver 402 be extracted separately from the adapter card driver 404 since the resulting extracted file violates the size requirement. Further, the adapter card driver 404 is not intended for execution by the host processor 200. Thus, the host driver 402 and the adapter card driver 404 could be stored and used as two separate files, which is undesirable for many reasons, as previously described.

FIG. 4B is a figurative diagram illustrating a driver bundle 408 according to the present invention. The host driver 402 is compressed into a self-extracting executable driver 406, which is prepended to the adapter card driver 404. The driver bundle 408, including the compressed host driver 406 having a size of approximately 15 Kbytes, combined with the uncompressed adapter card driver 404, has a total size of approximately 61 Kbytes. The particular sizes may vary, but the combined size with the compressed host driver 406 is less than or equal to 64 Kbytes. Thus, the driver bundle 408 meets the requirements of a command file and may be directly loaded and executed by the host processor 200.

FIG. 4C is a figurative diagram illustrating storage and execution of the driver bundle 408. The driver bundle 408 is stored as a separate command file in storage memory 410, where the storage memory 410 represents any type of storage device, such as the floppy disk drive 108, the hard disk drive 112, the CD-ROM drive 114, the storage device 118 located in the network 104, or even the ramdisk portion 204a of the main memory 204 of a diskless workstation. Upon execution, the driver bundle 408 is loaded into memory, such as the main memory 204 of the computer system 102 or the executable portion 204a of a diskless workstation, and executed by a processor, such as the processor 200. Upon execution, the processor 200 expands the compressed host driver 406 into the original host driver 402, thereby overwriting the upper portion of the adapter card driver 404 within the main memory 204. Nonetheless, the processor 200 then executes the host driver 406, which instructs the processor 200 to retrieve the adapter card driver 404 from the storage memory 410 and to download the adapter card driver 404 to the NIC 210. In this manner, the driver bundle 408 remains as a single executable command file.

Figure 5:
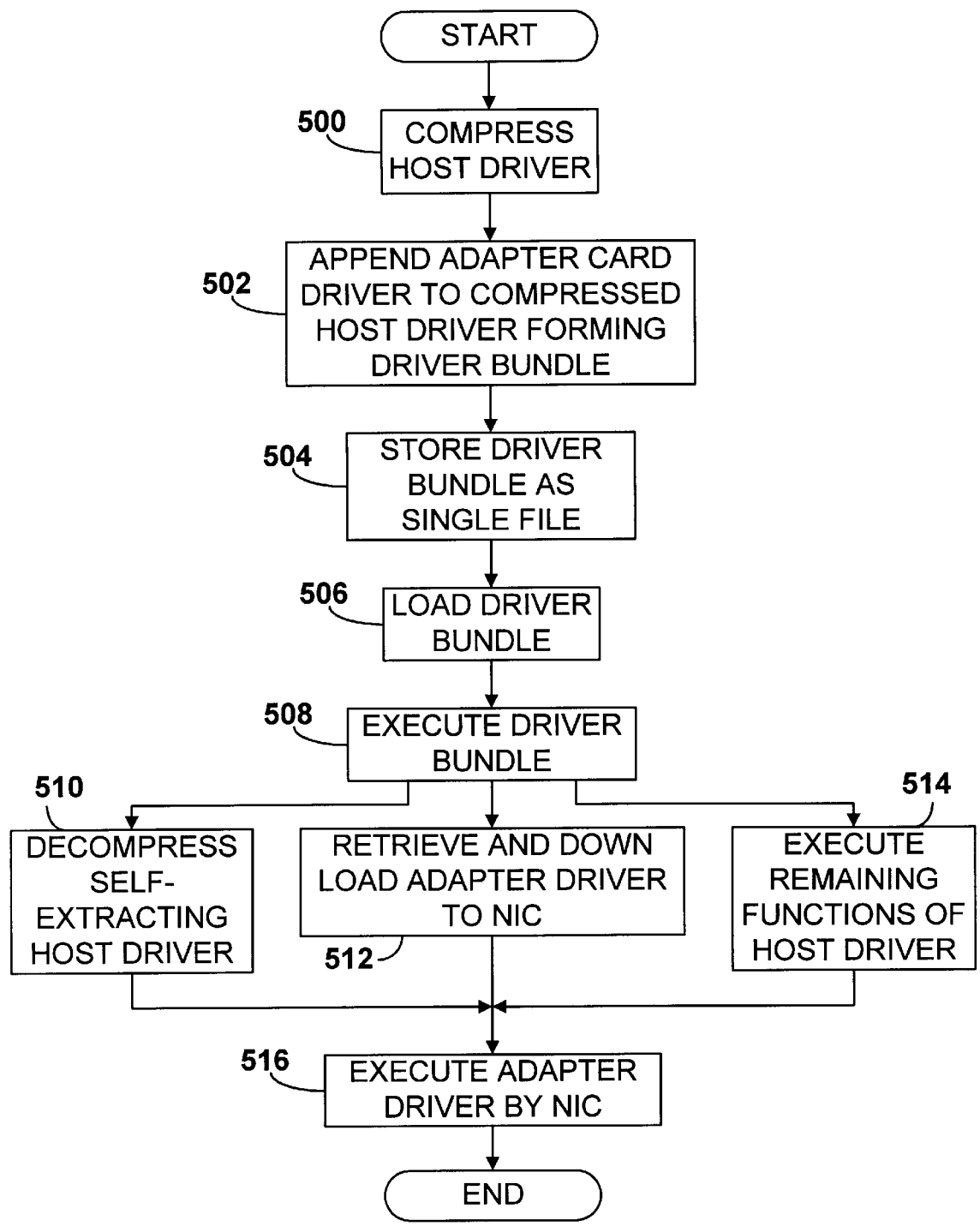
FIG. 5 is a flowchart diagram illustrating a method of providing and executing a driver bundle according to the present invention.

Referring now to FIG. 5, a flowchart diagram is shown illustrating a method of providing and executing a driver bundle according to the present invention. In a first step 500, the host driver 402 is compressed to form the self-extracting and executable compressed host driver 406. Such compression is achieved using any available compression program, such as PKZIP® or PKLITE by PKWARE, Inc., or the like. In next step 502, the adapter card driver 404 is appended to the end of the compressed host driver 406 forming the single executable driver bundle 408. In next step 504, the driver bundle 408 is stored as a single executable file in any storage format or media, such as a magnetic disk drive, optical disk, CD-ROM, RAM, etc. Upon power-up of a computer system, the driver bundle 408 is loaded into memory, such as main memory 204 or 204a of the computer system 102, according to next step 506. Then, a processor, such as the processor 200, executes the driver bundle 408 in next step 508. During execution of the driver bundle 408, the compressed host driver 406 expands to the host driver 402 in step 510. Still during execution of the driver bundle 408, the adapter card driver 404 is retrieved from the storage location and copied to the RAM 316 of the memory 308 of the NIC 210 as indicated in step 512. Thereafter, the remaining functions of the host driver 402 are performed by the processor 200 as indicated in step 514. Meanwhile, after the adapter card driver 404 is downloaded to the memory 308, it is executed by the NIC processor 306 as indicated in step 516.

It is now appreciated that a driver bundle according to the present invention provides ease of use and avoids problems associated with multiple driver routines stored as separate files. The combined size of the original host driver and adapter card driver is too large to qualify as a driver command file. Thus, the host driver is compressed into an executable, self-extracting file, and then the adapter card is appended thereto. The resulting driver bundle has a size less than the maximum size of a command file, and thus is executed as though it were a single driver. Such extraction is essentially transparent to the user. The user, such as a network administrator, is relieved of the responsibility of monitoring and managing multiple driver files. The possibility of separating multiple driver files or combining incompatible driver files is substantially reduced using a driver bundle according to the present invention.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:
   a host memory for storing a driver bundle, said driver bundle including a compressed, self-extracting and executable host driver prepended to an adapter card driver;
   a host processor coupled to said host memory for executing said driver bundle;
   an expansion bus coupled to said host processor and said host memory; and
   an adapter card coupled to said expansion bus, said adapter card comprising:
      an adapter processor for executing said adapter card driver, and
      adapter memory coupled to said adapter processor;
   wherein said driver bundle, when executed by said host processor, commands said host processor to expand said compressed host driver within said host memory, to execute said expanded host driver, and to download said adapter card driver to said adapter memory of said adapter card.

2. The computer system of claim 1, further comprising:
   a storage device coupled to said host processor for storing said driver bundle; and
   wherein said host processor retrieves said driver bundle from said storage device, loads said driver bundle into said host memory and executes said driver bundle.

3. The computer system of claim 2, wherein said storage device comprises a floppy disk drive.

4. The computer system of claim 2, wherein said storage device comprises a hard disk drive.

5. The computer system of claim 2, wherein said storage device comprises a CD-ROM disk drive.

6. The computer system of claim 1, further comprising:
   said adapter card being a network adapter card
   a network coupled to said network adapter card, said network including a storage device for storing said driver bundle; and said adapter memory including boot up code for initiating operation of said network adapter card;

wherein said adapter processor, upon power up, executes said boot up code, retrieves said driver bundle from said storage device of said network and provides said driver bundle to said host memory, and wherein said host processor executes said driver bundle from said host memory.

7. The computer system of claim 6, wherein said host memory includes a ramdisk portion and an executable portion.

8. The computer system of claim 1, wherein said driver bundle is a command file having a size less than 64 kilobytes, and wherein the combined size of said expanded host driver plus said adapter card driver is greater than 64 kilobytes.

9. The computer system of claim 1, wherein said adapter card is a network adapter card for enabling the computer system to communicate with a network.

10. A driver bundle for a host computer with an adapter card, the host computer including a host processor and the adapter card is logic, the driver bundle comprising:

a compressed, self-extracting and executable host driver for execution by the host processor, and an adapter card driver, for execution by the processing logic of the adapter cord, appended to said compressed host driver to form a single executable driver bundle;

wherein said driver bundle has a size less than the maximum allowable size for a command file for execution by the host processor.

11. The driver bundle of claim 10, wherein said maximum allowable size is 64 kilobytes.

12. The driver bundle of claim 10, wherein said compressed host driver, when executed, includes commands for expanding itself into an executable host driver and to execute said expanded host driver, which host driver includes commands to download said adapter card driver from a storage device to the adapter card.

13. A method for providing drivers for a computer system and an adapter card, comprising the steps of:

compressing a host driver into a self-extracting, executable command file for execution by the computer system; and appending an adapter card driver, for execution by processing logic on the adapter card, to the end of the compressed host driver forming a single driver bundle command file for execution by the computer system.

14. The method of claim 13, wherein the computer system includes a host processor and host memory for executing the driver bundle command file, and storage memory for storing the driver bundle command file, further comprising the steps of:

loading the driver bundle command file from the storage memory into the host memory;

executing the driver bundle command file;

extracting the host driver within the memory;

retrieving the adapter card driver from the storage device; and downloading the adapter card driver to the adapter card.

15. The method of claim 14, wherein the adapter card is a network adapter card for enabling the computer system to communicate with a network, the network including a storage device for storing the driver bundle command file, prior to said step of loading the driver bundle command file from the storage memory into the host memory, further comprising the step of:

transferring the driver bundle command file from the storage device of the network to the storage memory of the computer system.

16. A computer system comprising:

a host memory;

an adapter card including processing logic;

a local storage that stores a driver bundle, the driver bundle including a compressed, self-extracting host driver and an adapter driver; and a processor coupled to the host memory, the adapter card and the local storage, wherein the processor copies the driver bundle into host memory and executes the driver bundle, wherein the driver bundle instructs the processor to extract and execute the host driver within the host memory, and wherein the host driver instructs the processor to transfer the adapter driver from the local storage to the adapter card for execution by the processing logic of the adapter card.

17. The computer system of claim 16, wherein the host driver and the adapter driver are compatible to enable proper operation of the adapter card with the computer system.

18. The computer system of claim 16, wherein the local storage comprises a portion of the host memory.

19. The computer system of claim 16, further comprising:

a network coupled to the adapter card;

a network storage coupled to the network that stores the driver bundle; and the adapter card retrieving the driver bundle from the network storage via the network and providing the driver bundle to the local storage.

* * * * *

UNITED STATES PATENT AND TRADEMARK OFFICE
CERTIFICATE OF CORRECTION

PATENT NO.        : 5,819,115
APPLICATION NO. : 08/672648
DATED             : October 6, 1998
INVENTOR(S)       : Geoffrey B. Hoese et al.

Page 1 of 1

It is certified that error appears in the above-identified patent and that said Letters Patent is hereby corrected as shown below:

Claim 10, Column 9, line 22, after "adapter card" delete "is" and insert therefor --including processing--

Signed and Sealed this

Fifteenth Day of September, 2009

David J. Kappos
*Director of the United States Patent and Trademark Office*